United States Patent [19]

Toborg

[11] Patent Number: 5,628,621
[45] Date of Patent: May 13, 1997

[54] REINFORCED COMPRESSOR ROTOR COUPLING

[75] Inventor: Steven M. Toborg, Lynn, Mass.

[73] Assignee: General Electric Company, Cincinnati, Ohio

[21] Appl. No.: 686,882

[22] Filed: Jul. 26, 1996

[51] Int. Cl.⁶ .................................................. F01D 5/02
[52] U.S. Cl. .................................................. 416/198 A
[58] Field of Search ........................... 416/198 A, 204 A, 416/248, 500

[56] References Cited

U.S. PATENT DOCUMENTS

| 2,741,454 | 4/1956 | Eppley | 416/198 A |
| 3,916,495 | 11/1975 | Klassen et al. | 416/198 A |
| 4,123,199 | 10/1978 | Shimizu et al. | 416/198 A |
| 4,247,256 | 1/1981 | Maghon | 416/198 A |
| 5,284,421 | 2/1994 | Chlus et al. | 416/248 |
| 5,507,620 | 4/1996 | Primoschitz et al. | 416/198 A |
| 5,536,144 | 7/1996 | Bednard et al. | 416/198 A |

OTHER PUBLICATIONS

General Electric Company, "Technical Manual TM 55–2840–258–23P," 30 Apr. 1989, pp: cover and Fig. 10.

Primary Examiner—John T. Kwon
Attorney, Agent, or Firm—Andrew C. Hess; Wayne O. Traynham

[57] ABSTRACT

A compressor rotor includes a rim having airfoils extending radially outwardly therefrom, and a corresponding web and hub extending radially inwardly. A row of curvic coupling teeth extends axially away from one end of the rim. An imperforate support ring extends radially inwardly from the rim end for carrying hoop loads. And, a balance ring extends radially inwardly from the support ring, and includes a balance notch circumferentially splitting the balance ring.

10 Claims, 3 Drawing Sheets

REINFORCED COMPRESSOR ROTOR COUPLING

BACKGROUND OF THE INVENTION

The present invention relates generally to gas turbine engines, and, more specifically, to compressor rotors having curvic couplings.

One type of gas turbine engine includes an axial compressor having several stages joined together using a central tie rod. The compressor is typically formed in axial segments, with one or more rows of compressor blades or airfoils extending radially outwardly from a common annular rim. Adjacent rims use curvic coupling teeth at opposing axial ends thereof which engage each other to circumferentially interlock the rotor segments when axially clamped together using the tie rod.

Curvic couplings are commonly used in axial compressors of small gas turbine engines. The coupling is defined by the complementary curvic coupling teeth which extend axially outwardly from respective rotor rims and are circumferentially spaced apart from each other. The complementary curvic teeth of the adjacent rims engage each other to interlock the adjacent rims and carry torsional loads therethrough.

Each rotor segment is typically dynamically balanced prior to assembly with the adjacent rotor segments. Balancing is conventionally effected by providing a specifically sized balance ring at each end of the rotor adjacent to the curvic teeth. The balance ring is initially sized in axial and radial extent so that a full axial notch extending radially outwardly into the balance ring may be machined for removing a specified amount of material for effecting dynamic balancing of the rotor in the two planes defined at opposite axial ends of the rotor.

Since the balance notch splits the balance ring at one circumferential location, the ring no longer extends a full 360° in circumference and therefore loses its hoop strength capability for carrying hoop loads. The remaining split ring, therefore, merely provides dead weight once the balance notch is created. The centrifugal force generated from the dead weight is carried during operation of the rotor by the portion of the rim adjacent to the curvic teeth.

The substantial centrifugal force generated by the rotating airfoils is carried by the portions of the rim directly below the airfoils and by an integral web and hub defining a disk specifically configured and sized for carrying centrifugal loads. The centrifugal loads are directly proportional to radius from the axial centerline of the rotor and rotational speed squared and therefore it is desirable to minimize mass at large radius, while at the same time providing a suitable disk for carrying the centrifugal loads. The disk hub has a relatively large cross sectional area for carrying the centrifugal loads which are transmitted in part from the airfoils and rim through the relatively axially narrow web in a conventional hour glass axial profile.

The outer surface of the rotor rim typically defines the radially inner flowpath surface of the compressor as air is compressed in turn from stage to stage. The aerodynamic requirements of the compressor determine the required shapes of the airfoils and their sizes including the radial position of the rotor rim. In one conventional axial compressor design, the rotor rim at the curvic teeth defines the life limiting location of the rotor due to conventional low cycle fatigue (LCF). The small rings used for balancing the rotor actually reduce the low cycle fatigue strength of the rotor at the curvic teeth since the balance notch splits the ring and eliminates its hoop strength, with the remaining split ring providing dead weight which must instead be carried by the rotor rim.

In some conventional designs, the LCF strengths may be increased by relocating the curvic coupling and corresponding teeth at a smaller radius provided by an integral support cone extending from the rotor rim. In this way, the curvic coupling is located at a smaller radius for a given design to decrease the circumferential loads for increasing LCF life. However, an additional annular flowpath spacer is then required between the adjacent stages to fill in the void created near the rotor rims by relocating the curvic coupling radially inwardly. This increases the cost and complexity of the design for achieving suitable LCF life.

SUMMARY OF THE INVENTION

A compressor rotor includes a rim having airfoils extending radially outwardly therefrom, and a corresponding web and hub extending radially inwardly. A row of curvic coupling teeth extends axially away from one end of the rim. An imperforate support ring extends radially inwardly from the rim end for carrying hoop loads. And, a balance ring extends radially inwardly from the support ring, and includes a balance notch circumferentially splitting the balance ring.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
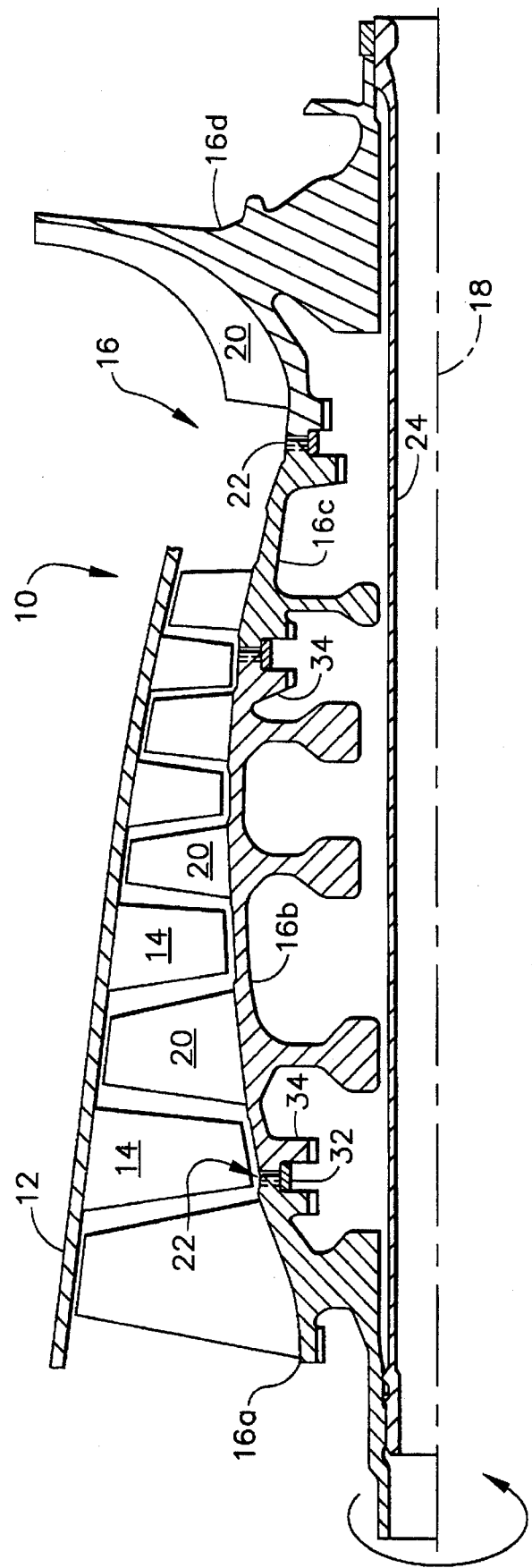
FIG. 1 is a partly sectional, axial view of an exemplary axi-centrifugal gas turbine engine compressor including curvic couplings in accordance with one embodiment of the present invention.

Illustrated in FIG. 1 is an exemplary axial-centrifugal compressor 10 for an aircraft gas turbine engine, The compressor 10 includes a stationary casing 12 having a plurality of axially spaced apart rows of compressor vanes 14 suitably joined thereto. An axi-symmetrical compressor rotor 16 is disposed inside the casing 12 and coaxially about a longitudinal or axial centerline axis 18.

The assembled rotor 16 is an assembly of individual rotors or rotor portions designated with the suffixes a–d, with each rotor having one or more rows of conventional compressor blades or airfoils 20 suitably joined thereto which rotate with the rotor for compressing air from stage to stage through the corresponding vanes 14 and blades 20 in a conventional manner. The first three rotors 16a–c and blades 20 thereon define the axial portion of the compressor 10, with the fourth rotor 16d defining the centrifugal portion wherein the blades 20 thereon are configured for channeling the compressed air radially outwardly for additionally centrifugally compressing the air.

The several rotors 16a–d are joined together using conventional curvic couplings 22 between adjoining axial ends thereof to define a rotor assembly which is suitably axially clamped together using a conventional tie rod 24 which extends through the center thereof.

Since curvic couplings may define the life limiting location of a rotor due to conventional low cycle fatigue (LCF), the several rotors 16a–d are specifically configured in accordance with the present invention to reinforce the curvic couplings 22 and substantially increase the LCF life of the rotor at the design operating speeds of the engine. The three exemplary couplings 22 illustrated in FIG. 1 are similarly configured and defined at the adjoining ends of the respective rotors, and are similarly reinforced in accordance with the present invention for increasing LCF life. In the exemplary embodiment illustrated in FIG. 1, the first coupling 22 is disposed between the first and second stages of the compressor; the second coupling 22 is disposed between the fourth and fifth stages; and the third coupling 22 is disposed between the fifth and sixth stages of the compressor. Accordingly, each rotor may have a single row of blades extending therefrom, or several rows as desired.

Figure 2:
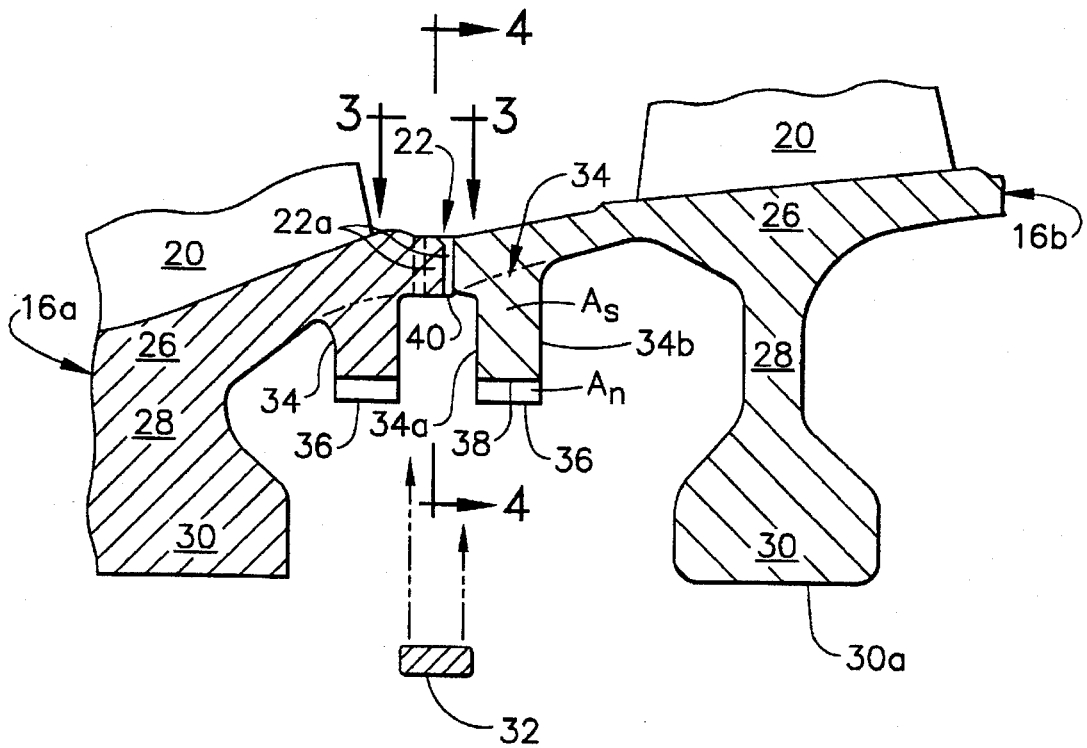
FIG. 2 is an enlarged axial view of a portion of adjoining rotor rims defining a curvic coupling, and cooperating support and balance rings in accordance with one embodiment of the present invention.
Figure 3:
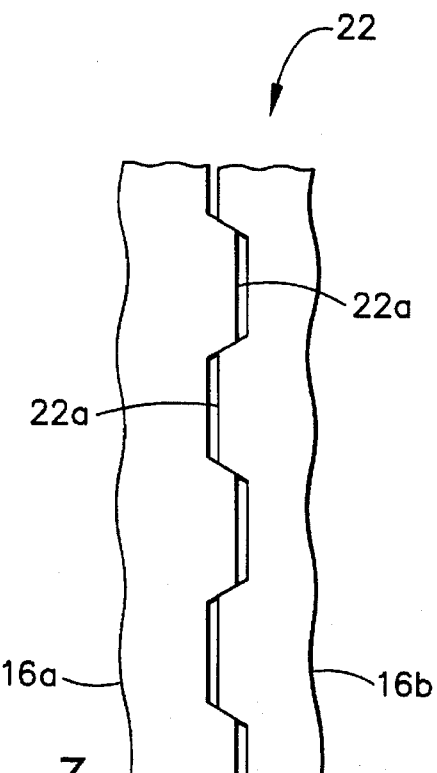
FIG. 3 is a top view of a portion of the curvic coupling illustrated in FIG. 2 and taken along line 3—3.

FIGS. 2 and 3 illustrate the exemplary first coupling 22 between the first and second stages for circumferentially interlocking together the first and second rotors 16a,b in accordance with one embodiment of the present invention. Each of the rotors includes an annular rim 26 from which extend radially outwardly therefrom a respective plurality of circumferentially spaced apart compressor blades or airfoils 20. In the exemplary embodiment illustrated, the blades 20 are integrally formed with the rims 26 in a conventional one-piece blisk arrangement. In alternate embodiments, conventional dovetail mounting may be used if desired.

Since the blades 20 are rotated at substantial speeds during operation, they generate substantial centrifugal forces which must be suitably carried by the respective rotors for enjoying a suitable useful life thereof. Accordingly, each of the rotors further includes an annular web 28 extending radially inwardly from respective rims 26 radially below the respective blades 20. An annular hub 30 extends radially inwardly from each of the respective webs 28 radially below the respective rims 26. Each hub 30 includes a central bore 30a which are all coaxially aligned about the centerline axis 18 as shown in FIG. 1, and through which the tie rod 24 extends.

As shown in FIG. 2, respective ones of the rim 26, web 28, and hub 30 are disposed in radial alignment to define corresponding disks which support the respective rows of blades 20. The outer surface of the rims 26 define the inner flowpath of the compressed air as it flows between the blades 20 and is located at the largest radius from the centerline axis 18. The rim 26 is conventionally configured in general radial symmetry as shown in FIG. 2 and decreases in axial thickness from the rim 26 to the web 28, having minimum axial thickness, with the axial thickness then increasing radially inwardly along the hub 30 in a conventional, generally hour glass profile. This configuration maximizes rotor strength for carrying the centrifugal loads generated by the blades 20 during operation while minimizing required material, since all the material rotates at speed and contributes to the centrifugal loads.

As shown in FIGS. 2 and 3, each of the adjoining ends of the adjacent rotors includes a row of conventional curvic coupling teeth 22a which extend axially away from the respective ends of the rims 26. The corresponding curvic teeth 22a as shown in FIG. 3 interlock together around the circumference of the rims for providing torque carrying capability during operation. Since the curvic teeth 22a are circumferentially spaced apart from each other on each rim 26, they cannot carry hoop loads and therefore act as mere dead weight, with the centrifugal load therefrom during operation being typically carried by the adjacent rims 26.

In order to seal the curvic teeth 22a during operation, a conventional annular seal 32 radially abuts the inner surfaces of the teeth 22a and provides additional dead weight which is typically also carried by the adjacent rims 26. The seal 32 may be a continuous ring formed of a suitable synthetic material like commercially available Vespel, or may be a suitable high temperature metal which may be split at one location along its perimeter.

In order to reinforce the curvic couplings 22 without adversely increasing centrifugal loads or adversely affecting the centrifugal load carrying capability of the corresponding rotor disks, a circumferentially continuous, imperforate support ring 34 is provided to extend radially inwardly from each rim end supporting the curvic teeth 22a (from the phantom line illustrated in FIGS. 2 and 4) for carrying centrifugal hoop loads. As shown in FIG. 2, cooperating pairs of the support rings 34 are disposed integrally with the adjoining rotor rims 26 and are spaced axially inwardly from the respective curvic teeth 22a, and spaced axially apart for receiving and axially trapping a respective curvic coupling seal 32. In order to balance the individual rotors 16, a balance ring 36 extends radially inwardly from each of the respective support rings 34 in an integral, one-piece assembly along with the curvic teeth 22a, rim 26, airfoils 20, web 28, and hub 30. The balance ring 36 is initially a circumferentially continuous, 360° member which is specifically sized to have a minimum radial cross sectional area so that it may be suitably machined for dynamically balancing each of the corresponding rotors 16a–b in a conventional manner.

Figure 4:
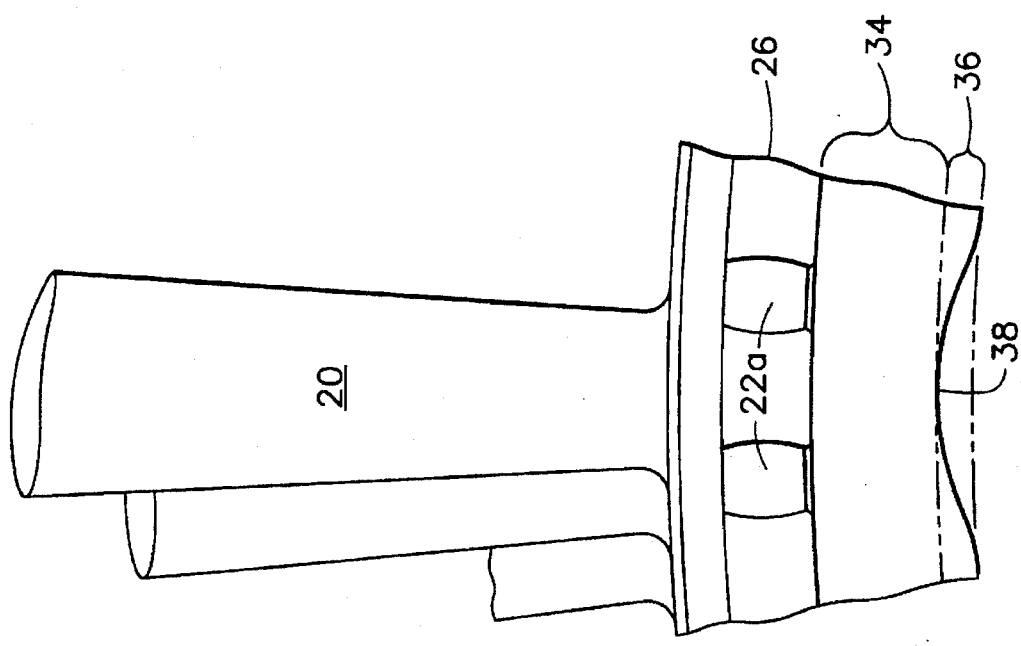
FIG. 4 is a radial view of a portion of the curvic coupling illustrated in FIG. 2 and taken along line 4—4.

FIGS. 2 and 4 illustrate an exemplary arcuate balance notch 38 extending radially outwardly into the radially inner surface of the balance ring 36 at one circumferential location, with the notch 38 extending completely axially through the balance ring 36 for circumferentially splitting the balance ring 36 and thereby eliminating hoop strength at the notch 38. The balance ring 36 and corresponding notch 38 therein may be sized in accordance with conventional practice to have a sufficient radial height or extent so that sufficient mass may be removed within the volume of the notch 38 for providing effective dynamic balancing of the rotors in a conventionally known manner.

However, like a conventional compressor rotor having a similar balance ring directly adjoining the curvic teeth, the split balance ring is not effective for carrying hoop loads, and therefore is mere dead weight which must be suitably otherwise carried by the rotor. In the prior art, the dead weight of the balance ring is carried by the rotor rim itself and therefore provides a LCF life limiting location near the curvic couplings.

In accordance with the present invention, the imperforate support ring 34 is added between the rotor rim 26 and the balance ring 36 to structurally reinforce the curvic couplings 22 and substantially improve LCF life without adding undesirable centrifugal loads from the support ring 34 itself. The support ring 36 is specifically sized in accordance with the present invention to carry centrifugally generated hoop loads due to itself as well as due to the dead weight of the curvic teeth 22a joined to the respective rim 26, and due to the split balance ring 36. And, the support ring 34 is also sized to carry a corresponding portion of the hoop loads due to the cooperating curvic coupling seal 32 which radially abuts the adjoining curvic teeth 22a. In this way, rotation of the rotors 16 at operating speed, creates centrifugal loads in the seal 32, curvic teeth 22a, support ring 34, and balance ring 36 which are specifically carried by the support ring 34 itself due to its inherent hoop strength which is uncompromised by the balance ring 36.

As shown in FIG. 2, the support ring 34 includes first and second axially opposite end faces 34a,b extending radially inwardly from the rim end at the curvic teeth 22a which are spaced axially away from the curvic teeth 22a, and are coextensive with the corresponding sides of the balance ring 36. The end faces 34a,b of the support ring 34 with the balance ring 36 define a common radially inwardly extending flange. The curvic teeth 22a and the outwardmost adjacent one of the end faces, 34a, define in part a portion of a seat 40 for receiving the seal 32, with the remaining portion of the seat 40 being defined by the cooperating teeth 22a and end face (34a) of the adjacent rotor. In this way, the adjacent support rings 34 of the adjoining rotors provide a generally inverted U-shaped seat 40 which axially traps the seal 32 therein. The corresponding support rings 34 are therefore additionally sized to also carry the centrifugal loads from the seals 32, with portions thereof being carried by respective ones of the support rings 34.

As shown in FIG. 2, each of the support rings 34 has a corresponding radial cross sectional area $A_s$ which is suitably greater than the corresponding radial cross sectional area $A_n$ of the balance notch 38 for providing suitable hoop strength to carry the centrifugal loads from the support ring 34 itself, the split balance ring 36, the curvic teeth 22a, and a corresponding portion of the seal 32.

Accordingly, the introduction of the separate support ring 34 between the rotor rim 26 and the balance ring 36 adjacent to the coupling teeth 22a provides a substantial reinforcement of the curvic couplings 22 without adversely increasing centrifugal loads therefrom, or without adversely affecting the centrifugal stresses in the rotor disk below the blades 20 which may keep a conventional profile. As shown in FIG. 2, the support ring 34 is preferably spaced axially away from the web 28 and has a suitable transition radius with the inner surface of the rim 26. In this way, load carrying performance of the support ring 34 is uncoupled from the load carrying performance of the disk including the rim 26 and cooperating web 28 and hub 30.

Furthermore, the enhanced strength provided by the support rings 34 allows the curvic couplings 22 to remain at the same radial elevation as that of the respective rims 26 while still obtaining a suitable LCF life. The background section above describes one prior art compressor design requiring separately mounting the curvic coupling radially inwardly of the rim 26 using a supporting cone and a corresponding flowpath spacer for obtaining a useful LCF life. The same compressor may instead relocate the curvic coupling at the rotor rim 26 and eliminate the flow spacer due to the enhanced strength of the reinforcing support ring 34. And, most significantly, all of the curvic couplings 22 illustrated in the exemplary embodiment of FIG. 1 may enjoy a substantially greater LCF life than that available from conventional designs. For example, the support rings 34 may be sized for obtaining a LCF life at the coupling teeth 22a of about 100,000 cycles which is greater than 3 times the LCF life using a conventional curvic coupling without the flowpath spacer which cannot possibly achieve this life.

The support ring 34 may take various configurations and blend differently into the adjoining rotor rim 26. It is desirable to maintain the balance ring 36 at the maximum possible radius from the centerline axis 18 for maximizing the balancing effect of the notch 38 formed therein. However, introducing the support ring 34 necessarily displaces the balance ring 36 radially inwardly, with the support rings 34 being suitably sized for supporting the centrifugal loads described above.

Figure 5:
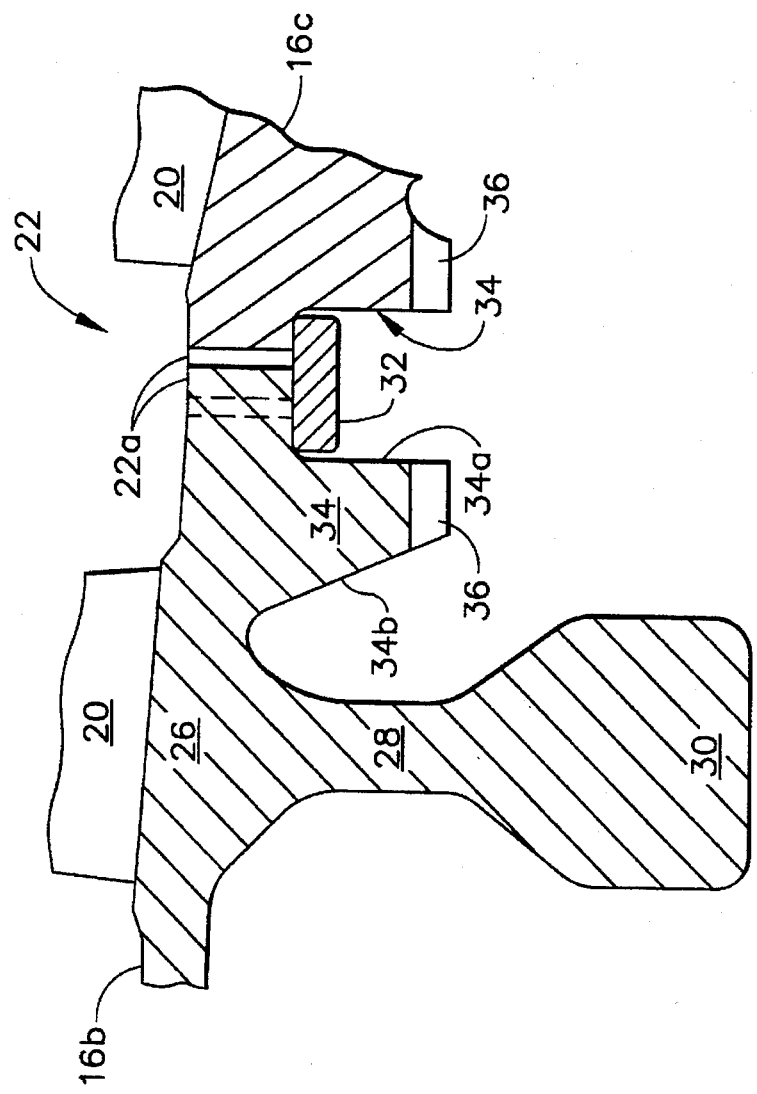
FIG. 5 is an enlarged axial view of a portion of the compressor illustrated in FIG. 1 showing another curvic coupling in accordance with another embodiment of the present invention.

In the exemplary embodiment illustrated in FIG. 2, the support ring end faces 34a,b are substantially parallel to each other and coextensive with the sides of the balance ring 36. FIG. 5 illustrates another embodiment of the reinforced curvic coupling 22 between the fourth and fifth stages of the compressor joining together the second and third rotors 16b,c. In this embodiment of the left support ring 34 illustrated in FIG. 5, the corresponding end faces 34a,b converge radially inwardly toward the balance ring 36 to increase the width of the support ring 34 at its radially outer dimension while decreasing the axial width of the support ring 34 at its radially inner dimension adjacent to the balance ring 36.

In this way, increased radial cross sectional area of the support ring 34 may be provided while at the same time decreasing its radial extent to maximize the hoop strength of the support ring 34 while maintaining the balance ring 36 at a radially maximum diameter. In the exemplary embodiment illustrated in FIG. 5, the first end face 34a extends radially in a single axial plane, whereas the second end face 34b is inclined axially toward the adjoining web 28 with a suitable transition radius therebetween for minimizing stress concentration.

A significant advantage of the present invention is that it allows a relatively large diameter curvic coupling 22 to have a much longer LCF life than it would otherwise have without the support ring 34. The reinforced curvic coupling 22 has increased hoop strength even at relatively large diameter, and therefore may be located at the flowpath defined by the outer surface of the rotor rims 26 which avoids the use of the conventional flowpath spacers as described above for the same or better LCF life.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A gas turbine engine compressor rotor comprising:

a rim having a plurality of circumferentially spaced apart airfoils extending radially outwardly therefrom;

a web extending radially inwardly from said rim below said airfoils;

a hub extending radially inwardly from said web below said rim;

a row of curvic coupling teeth extending axially away from one end of said rim;

an imperforate support ring extending radially inwardly from said rim end for carrying hoop loads; and a balance ring extending radially inwardly from said support ring, and having a balance notch circumferentially splitting said balance ring and eliminating hoop strength thereat.

2. A rotor according to claim 1 wherein said support ring is sized to carry hoop loads due to dead weight of said curvic teeth and said split balance ring upon rotation of said rotor.

3. A rotor according to claim 2 wherein said support ring includes first and second axially opposite end faces extending radially inwardly from said rim end and spaced axially away from said curvic teeth, and being coextensive with said balance ring.

4. A rotor according to claim 3 wherein said curvic teeth and an adjacent one of said end faces define in part a seat for receiving a curvic coupling seal, and said support ring is sized to additionally carry hoop loads due to a portion of said seal.

5. A rotor according to claim 3 wherein said support ring has a greater radial cross sectional area than said balance notch for providing hoop strength to carry said hoop loads.

6. A rotor according to claim 3 wherein said end faces are substantially parallel to each other.

7. A rotor according to claim 3 wherein said end faces converge radially inwardly toward said balance ring.

8. A rotor according to claim 3 wherein said support ring is spaced axially away from said web.

9. A rotor according to claim 3 wherein said support ring is sized for obtaining a low cycle fatigue life at said curvic teeth of about 100,000 cycles.

10. A rotor according to claim 3 wherein said rim, airfoils, web, hub, curvic teeth, support ring, and balance ring are an integral one-piece assembly.

* * * * *